United States Patent
Segall et al.

(10) Patent No.: US 7,460,436 B2
(45) Date of Patent: Dec. 2, 2008

(54) APPARATUS AND METHOD FOR HYDRAULIC FRACTURE IMAGING BY JOINT INVERSION OF DEFORMATION AND SEISMICITY

(75) Inventors: Paul Segall, Palo Alto, CA (US); Sang-Ho Yun, Seoul (KR)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 226 days.

(21) Appl. No.: 11/634,352

(22) Filed: Dec. 4, 2006

(65) Prior Publication Data

US 2007/0127313 A1 Jun. 7, 2007

Related U.S. Application Data

(60) Provisional application No. 60/742,718, filed on Dec. 5, 2005.

(51) Int. Cl.
    *E21B 47/00* (2006.01)
(52) U.S. Cl. .................. 367/35; 166/250.1; 702/16
(58) Field of Classification Search .............. 367/25, 367/35, 38; 702/16; 166/250.01, 250.1
    See application file for complete search history.

(56) References Cited

U.S. PATENT DOCUMENTS

| | | | |
|---|---|---|---|
| 5,377,104 A * | 12/1994 | Sorrells et al. | 702/11 |
| 5,524,709 A * | 6/1996 | Withers | 166/250.1 |
| 5,934,373 A | 8/1999 | Warpinski et al. | |
| 6,002,063 A | 12/1999 | Bilak et al. | |
| 6,935,424 B2 | 8/2005 | Lehman et al. | |
| 7,111,681 B2 | 9/2006 | Detournay et al. | |
| 7,134,492 B2 * | 11/2006 | Willberg et al. | 166/250.1 |

OTHER PUBLICATIONS

Rothert et al., "Microseismic monitoring of borehole fluid injections; Data modeling and inversion for hydraulic properties of rocks", GEOPHYSICS, vol. 68., No. 2 (Mar. 2003) p. 685-689.*
Warpinski et al., "Microseismic and Deformation Imaging of Hydraulic Fracture Growth and Geometry in C Sand Interval, GRI/DOE M-Site Project", Society of Petroleum Engineers of AIME, vol. 1997, p. 87-98, 1997.*
Dieterich, "A constitutive law for rate of earthquake production and its application to earthquake clustering," Journal of Geophysical Research, vol. 99, No. B2, 2601 (Feb. 1994).

* cited by examiner

*Primary Examiner*—Ian J Lobo
(74) *Attorney, Agent, or Firm*—Lumen Patent Firm, Inc.

(57) ABSTRACT

A method for hydraulic fracture imaging consistently integrates ground deformation data and microseismic data. A time sequence of hydraulic fracture images is computed from the combined data by first computing an orientation and location of the fracture. A size of the fracture (e.g., length, width, and opening) and detailed shape is then computed consistent with the computed orientation using a stochastic optimization procedure. This procedure may be performed by selecting a candidate model of the fracture consistent with the computed orientation, computing a predicted surface deformation from the candidate model (e.g., using elastic crack theory), computing a predicted seismic activity from the candidate model (e.g., using Dieterich seismicity rate theory), and comparing the predicted surface deformation and predicted seismic activity with the collected ground deformation data and earthquake locations derived from the collected seismic activity data.

12 Claims, 7 Drawing Sheets

Comparison of True Input with Estimate from Surface Deformation Only

*Fig. 4A*

True Input and Estimate from Surface Deformation Plus
Seismicity - Conjugate Plane Ambiguity

Hydraulic fracture-induced seismicity: conjugate faults

APPARATUS AND METHOD FOR HYDRAULIC FRACTURE IMAGING BY JOINT INVERSION OF DEFORMATION AND SEISMICITY

CROSS-REFERENCE TO RELATED APPLICATIONS

This application claims priority from U.S. provisional patent application No. 60/742,718 filed Dec. 5, 2005, which is incorporated herein by reference.

FIELD OF THE INVENTION

The present invention relates generally to hydraulic fracture imaging. More specifically, it relates to techniques for imaging hydraulic fractures by combining both ground deformation and seismic mapping in a mechanically consistent manner.

BACKGROUND OF THE INVENTION

The petroleum industry uses hydraulic fracturing to increase rock permeability thereby increasing the flow of oil to producing wells. More than 75% of US oil wells are hydraulically fractured. Internationally, the fraction is closer to 20% but some expect this to increase to 75% in the next few decades.

The operators need to know as much as possible about the induced fracture, including its orientation, length, whether it extends symmetrically from the borehole, its vertical extent, whether it traverses the producing horizons. Presently there are two technologies for doing this: 1) Make geodetic measurements of ground deformation caused by the fracture, either at the surface of the earth, or "down hole" using borehole instruments. This is most commonly done using sensitive tilt meters, although other methods may be used. 2) Record micro-earthquake seismicity that accompany the growth of the fracture. As the fracture propagates it causes breakage of the rock and these can be recorded using standard seismological techniques. The seismometers may be placed in boreholes to reduce surface noise to improve the sensitivity to the extremely small quakes caused by the fracturing.

Among the various prior art approaches, some have considered combining ground deformation and seismic information. Unfortunately, the prior art does not provide a mechanically consistent or integrated approach for using deformation data in conjunction with the seismicity to achieve effective and efficient fracture imaging. In particular, it would be a key advance in the art to provide improved methods to determine characteristics of human created hydraulic fractures in the field of natural resource mining, such as petroleum extraction.

SUMMARY OF THE INVENTION

In view of the shortcomings of the prior art, the present invention provides a method for hydraulic fracture imaging that takes full advantage of deformation data and seismic or microseismic data. In other words, the present invention provides for a mechanically consistent and integrated approach to hydraulic fracture imaging using deformation and seismicity in a coherent manner.

In one aspect, the present invention provides a method for hydraulic fracture imaging. The method includes collecting data measured in proximity to a hydraulic fracture. Specifically, the collected data includes ground deformation data and seismic activity data. A time sequence of hydraulic fracture images is then computed from the ground deformation data and seismic activity data. The hydraulic fracture image representing the final configuration is then displayed. The hydraulic fracture images are computed by first computing an orientation and location of the fracture and then computing a size and shape of the fracture (e.g., length, width, and opening) consistent with the computed orientation using a stochastic optimization procedure.

The orientation of the fracture is preferably computed using a rectangular dislocation model to compute a dislocation that optimally fits the net ground deformation data and a plane that optimally fits earthquake locations derived from the seismic activity data. Differential location methods may be used to compute earthquake locations from the seismic activity data.

The stochastic optimization procedure preferably is performed by selecting a candidate model of the fracture consistent with the computed orientation, computing a predicted surface deformation from the candidate model (e.g., using elastic crack theory), computing a predicted seismic activity from the candidate model (e.g., using Dieterich seismicity rate theory), and comparing the predicted surface deformation and predicted seismic activity with the collected ground deformation data and earthquake locations derived from the collected seismic activity data. The candidate model preferably includes segments in a plane of the fracture, where each of the segments is open if it is part of the fracture and closed if it is not part of the fracture. In addition, the candidate model preferably includes pressure boundary conditions for segments that are open.

DETAILED DESCRIPTION

The present invention provides a method of fracture imaging that combines deformation and seismic mapping in a mechanically consistent and integrated fashion. This innovative combination begins with the recognition that the earthquakes respond to changes in stress caused by the propagation of the hydraulic fracture. The forward problem (i.e., to predict the earthquakes knowing the fracture evolution) is as follows: 1) Compute the stress change due to the fracture at all points near the fracture as a function of space and time using methods of elastic crack theory; 2) use Dieterich's seismicity rate theory to predict the rate of earthquake activity as a function of space and time. The integrated rate gives the cumulative number of earthquakes recorded in each voxel around the fracture. One may then invert this problem, i.e., take the measured tilts and earthquake locations and determine the position of the fracture at any given instant in time.

A principal advantage of the new approach is that surface deformation characterizes the long spatial wavelength components of the fracture, in particular the volume of the fracture, while the earthquakes, which depend on the stresses that are highly concentrated near the tip of the fracture, characterize the position of the fracture tip.

Figure 1:
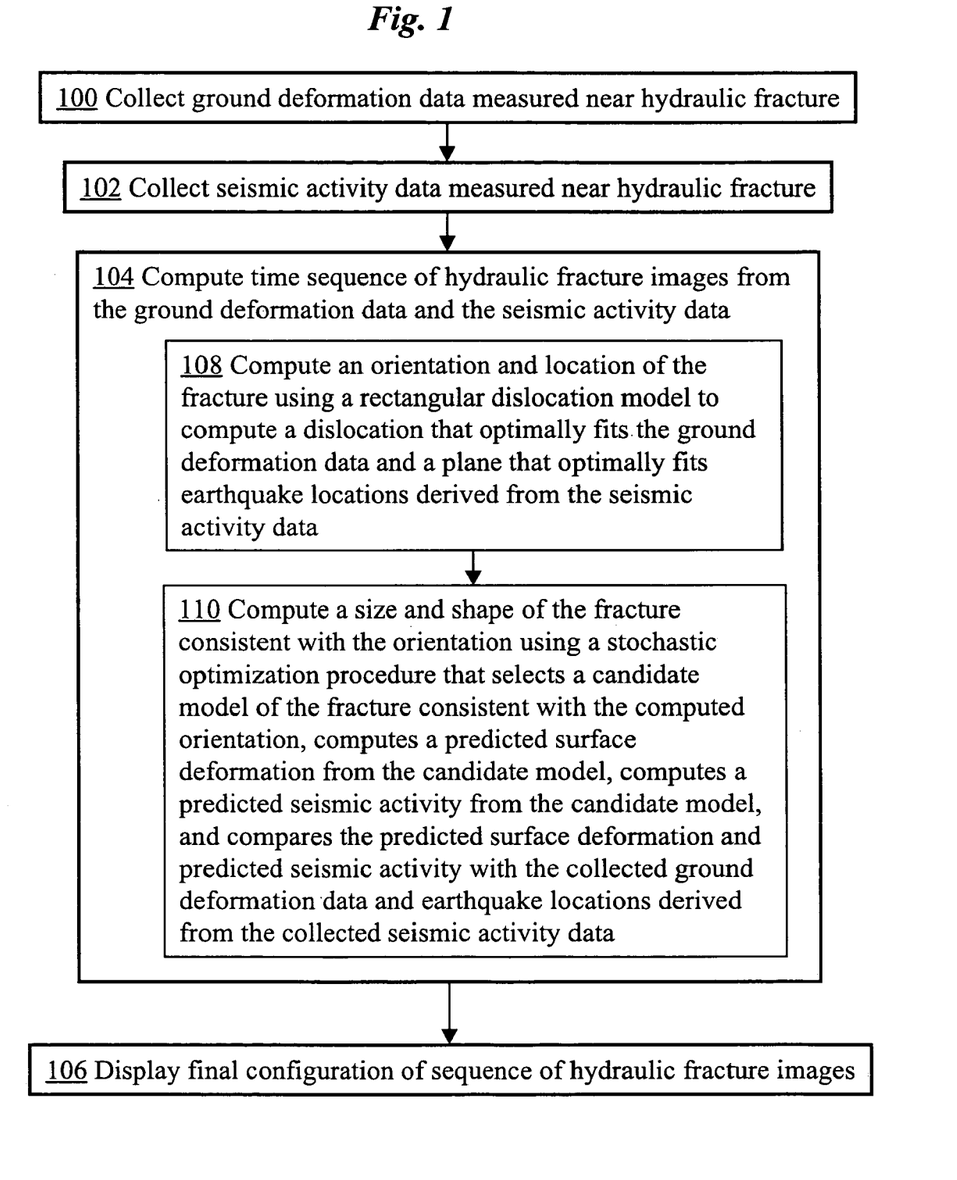
FIG. 1 is a flowchart illustrating a method for hydraulic fracture imaging according to an embodiment of the invention.
Figure 2:
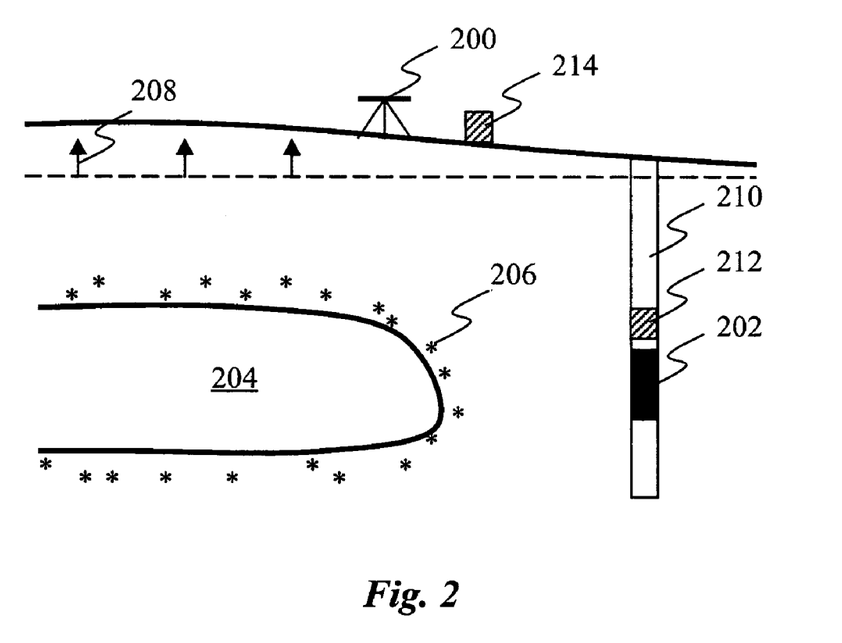
FIG. 2 illustrates a fracture and associated earthquakes and ground deformations which are measured and used in a method for hydraulic fracture imaging according to an embodiment of the invention.

A flowchart illustrating an embodiment of the invention is shown in FIG. 1. The method for hydraulic fracture imaging includes collecting ground deformation data measured near a hydraulic fracture in step 100 and collecting seismic activity data near a hydraulic fracture in step 102. These data may be measured using any of the various conventional techniques and instrumentation that are well known in the art. For example, as shown in FIG. 2, ground deformations 208 may be measured using a surface tilt meter 200 positioned on the ground surface above the fracture 204 and/or using a borehole tilt meter 202 in an underground borehole 210 near the fracture. Deformations may also be measured using interferometric synthetic aperture radar, satellite geopositioning, and other techniques. Microearthquakes 206 located around the boundary of fracture 204 can be measured with seismometers located at the surface, such as seismometer 214, and/or in a borehole, such as seismometer 212. The data is then communicated to a computer (not shown) which processes it. Returning to FIG. 1, in step 104 a time sequence of hydraulic fracture images is computed from the ground deformation data and seismic activity data. In step 106, an image representing a final configuration in the time sequence of the hydraulic fracture images is then displayed. The hydraulic fracture images are computed by first computing the mean position and orientation of the fracture and then computing the size and shape of the fracture consistent with the computed orientation using a stochastic optimization procedure.

The inverse approach has two steps, shown as substeps 108 and 110. As shown in substep 108, the orientation and location of the fracture in space is preferably computed using a rectangular dislocation model of the fracture to compute a dislocation that optimally fits the ground deformation data and a plane that optimally fits earthquake locations derived from the seismic activity data. A variant of this procedure would be to use recently developed differential location methods to achieve higher precision earthquake locations in the computation of earthquake locations from the seismic activity data. A constraint can be included that the fracture intersect the borehole in the packed-off interval.

In substep 110 we solve for the size and shape of the fracture (e.g., its length, width, and opening) using a stochastic optimization procedure. Preferably, a candidate model of the fracture is selected that is consistent with the computed orientation. The candidate model preferably divides the plane of the fracture into small segments, where each of the segments is open if it is part of the fracture and closed if it is not part of the fracture. In addition, the candidate model preferably includes pressure boundary conditions for segments that are open. The pressure may be constrained by the injection pressure at the borehole; alternatively, the pressure may be constrained as a function of position by the injection pressure and some estimate of viscous losses along the fracture. The predicted surface deformation for a candidate fracture model is computed using standard dislocation/crack theory. The predicted seismic activity (e.g., number of earthquakes in each voxel) is computed from the candidate model using Dieterich seismicity rate theory, i.e., by integrating the Dieterich equations. The predicted surface deformation and predicted seismic activity is compared with the collected ground deformation data and earthquake locations derived from the collected seismic activity data. A stochastic optimization procedure, such as simulated annealing, Markov chain Monte Carlo methods, or genetic algorithms, then tests thousands of candidate models to determine the crack shape, opening distribution, and parameters in the Dieterich theory that best fits the data.

Figure 4A:
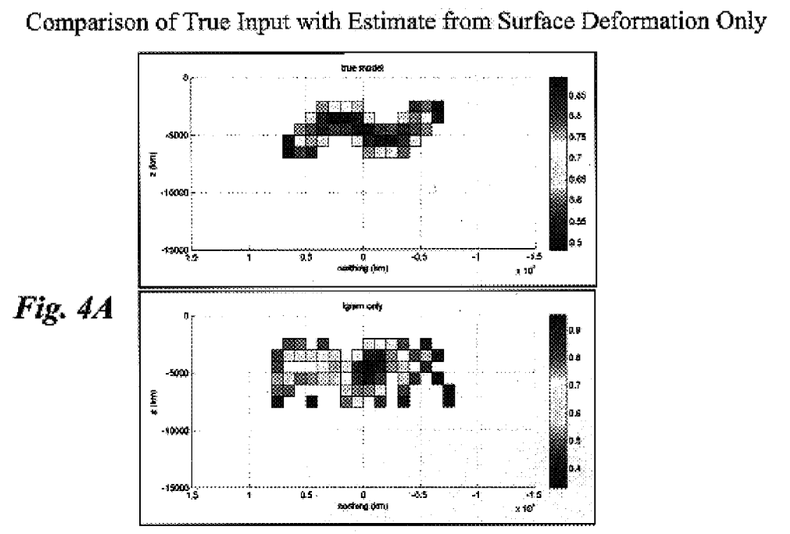
FIGS. 4A-C show predictions computed from candidate models compared to collected data, according to an embodiment of the invention.
Figure 4B:
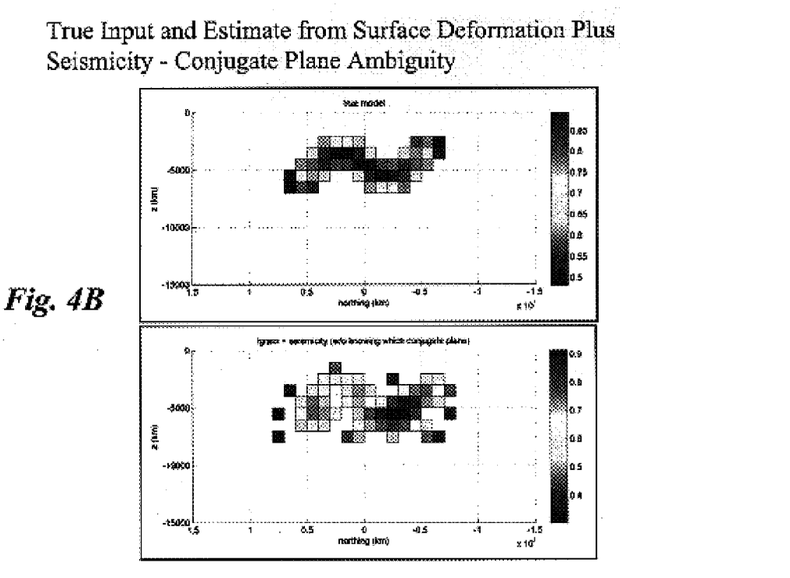
Figure 4C:
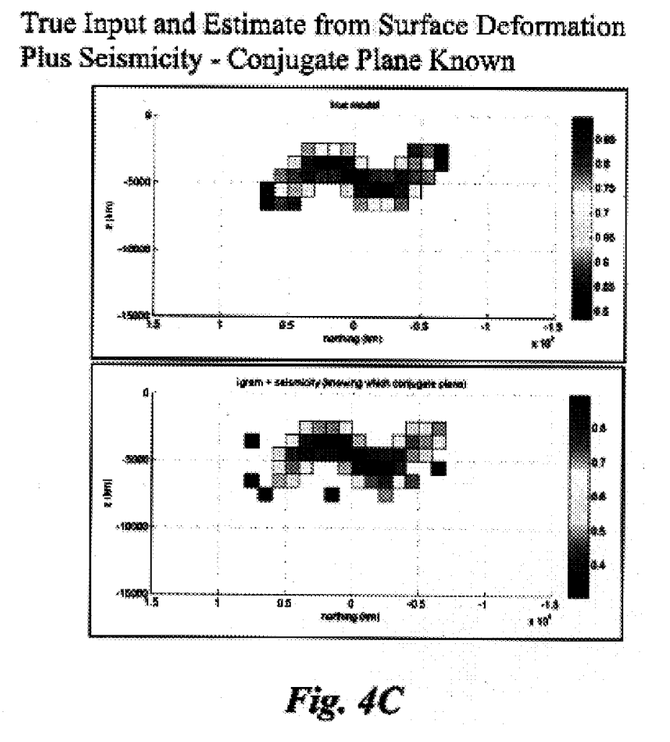

FIGS. 4A-C show predictions computed from candidate models compared to collected data. FIG. 4A shows collected data compared with predictions from surface deformation data alone. FIG. 4B shows collected data compared with predictions from both surface deformation data and seismicity data, in the case where it is unknown which earthquake nodal plane is the true fault plane, so that both must be tested. FIG. 4C shows collected data compared with predictions from both surface deformation data and seismicity data, in the case where the correct fault plane can be determined, for example by alignment of earthquakes.

We now discuss some of the mathematical details relevant to the computation of the predicted seismic activity and surface deformation from a candidate model.

At any given voxel in the space surrounding the fracture, the seismicity rate R is defined as the time rate of change of the cumulative number of events N in that voxel. The seismicity rate R is related to the background rate r, the background stressing rate $\dot{\tau}_r$, and a seismicity state variable $\gamma$ by the equation $$R = \frac{dN}{dt}$$
$$= \frac{r}{\gamma \dot{\tau}_r}.$$

The seismicity state variable $\gamma$ evolves according to $$d\gamma = \frac{1}{a\sigma}[dt - \gamma d\tau + \gamma(\tau/\sigma - \alpha)d\sigma],$$

where $\tau$ is shear stress, $\sigma$ is the effective normal stress (solid stress minus pore pressure), $a$ is a direct effect constitutive parameter, and $\alpha$ is a normal stress constitutive parameter.

Figure 3:
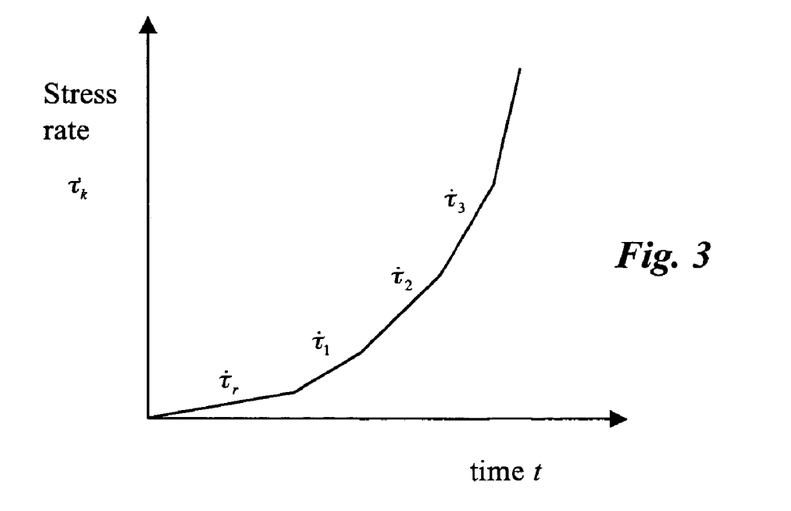
FIG. 3 is a graph of an arbitrary stress history approximated by a piecewise linear curve representing a series of increments of constant stressing rate, according to an embodiment of the invention.

For stressing at a constant rate $\dot{\tau}_k$, and no change in normal stress $\sigma$ $$\gamma_k = \left(\gamma_{k-1} - \frac{1}{t_k}\right)\exp\left(-\frac{t_k(t-t_k)}{a\sigma}\right) + \frac{1}{t_k}$$

and $$\frac{R(t)}{r} = \left[\left(t_r\gamma_{k-1} - \frac{t_r}{t_k}\right)\exp\left(-\frac{t_k(t-t_k)}{a\sigma}\right) + \frac{t_r}{t_k}\right]^{-1},$$

where $t_{k-1} < t < t_k$ and k is a discrete time index. An arbitrary stress history can be approximated by a series of increments of constant stressing rate, as shown in FIG. 3. Given the constitutive parameter a, a stress history $\{\tau_k; k=1,2,\ldots,N\}$, a background stressing rate $\tau_r$, and a background seismicity rate r, the seismicity rate R can be predicted. If the normal stress also changes then a similar equation applies where the shear stress is replaced with an effective Coulomb stress $s \equiv \tau - (\mu-\alpha)\sigma$, where $\mu$ is the coefficient of friction.

If the fracture is introduced very quickly compared to the rate at which seismicity evolves, then the potential earthquake generating slip surfaces experience a step change in stress. This case provides a relatively simple example of how the method can be utilized. Following a step change in stress $\Delta\sigma$ and return to background rate, the seismicity is predicted to follow i $N(t) = rt_\alpha \ln\{e^{\Delta\tau/a\sigma}(e^{t/t_\alpha}-1)+1\}$, where $t_\alpha = a\sigma/\tau_r$ is the aftershock decay time. This can be considered to be a non-linear function, $f$, of the normalized stress change, $\Delta\tau/a\sigma$ and normalized time, $t/t_\alpha$, as follows:

$N(t) = rt_\alpha f(\Delta\tau/a\sigma, t/t_\alpha)$.

The above relates the observed earthquakes, N(t) to the normalized stress change and time. We also have deformation measurements, tilt, strain, displacement, denoted by d, that can be related to the amount of fracture opening $\delta$, which itself is a function of position on the fracture. Elastic dislocation/crack theory provides a relationship between the fracture opening and the observed deformation, given the orientation and location of the fracture as determined in step 1. More specifically, $d = G\delta$, where d is deformation data, $\delta$ is the amount of fracture opening, and G is the matrix of Green's functions that relates fracture opening to observed deformation. A related set of Green's functions G' relates the fracture opening to the stress change in any voxel surrounding the hydraulic fracture, as follows:

$\Delta\tau = G'\delta$.

If both normal and shear stress change then G' relates the fracture opening to the effective Coulomb stress $s \equiv \tau - (\mu-\alpha)\sigma$. This relation can be substituted for the stress change in the seismicity observation equation yielding two equations that relate the observed seismicity, N(t), and deformation data, d, to the distribution of fracture openings, $\delta$, and various auxiliary parameters as indicated. Specifically, $N(t) = rt_\alpha f(G'\delta/a\sigma, t/t_\alpha)$ $d = G\delta$ The inverse problem is then to estimate the distribution of $\delta$'s that best fits the observations. In the preferred embodiment, the candidate model that best fits the data is the model that minimizes the quantity $\|\Sigma^{-1/2}(d-\hat{d})\|_2^2 + \kappa^2\|N(t)-\hat{N}(t)\|_2^2$.

The first term of this quantity represents the squared L-2 norm of the differences between the observed deformation d and the predicted deformation $\hat{d}$, weighted by in inverse square root of the data covariance matrix $\Sigma$. The second term represents the L-2 norm of the differences between the observed seismicity N(t) in each voxel at times t with the predicted seismicity $\hat{N}(t)$, weighted by a constant $\kappa^2$ representing the relative weight put on fitting the seismicity versus the deformation data. The optimization problem is solved using simulated annealing, Markov Chain Monte Carlo methods, or other stochastic optimization methods as appropriate.

Figure 5A:
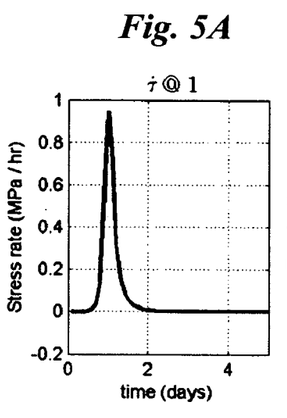
FIGS. 5A-F are graphs showing the results of forward calculations of the stress history, predicted seismicity rate, and cumulative number of quakes for two voxels, according to an embodiment of the invention.
Figure 5B:
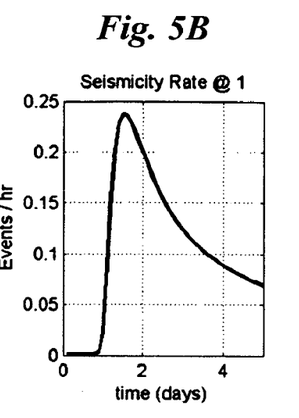
Figure 5C:
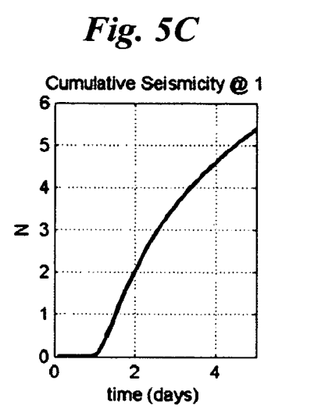
Figure 5D:
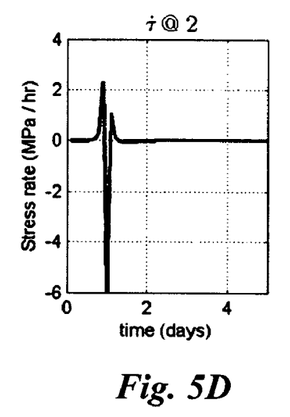
Figure 5E:
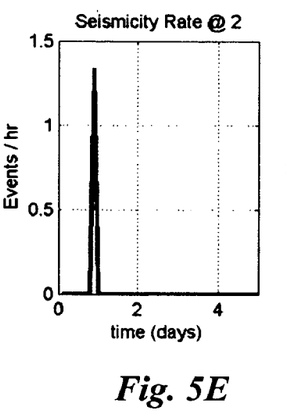
Figure 5F:
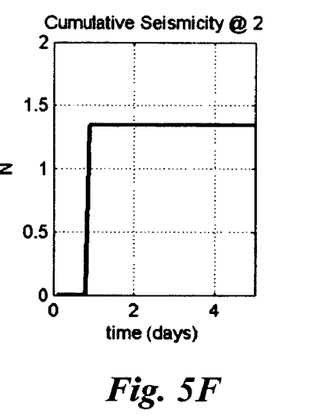

FIGS. 5A-F are graphs showing the results of forward calculations of the stress history, predicted seismicity rate, and cumulative number of quakes for two voxels. FIGS. 5A-C are for a voxel just below the vertical fracture, while FIGS. 5D-F are for a voxel adjacent to the fracture. Note that as the crack tip passes, the voxel adjacent to the fracture experiences an increased stress followed by a negative stress rate (stress decrease) as the fracture shadows the voxel. This causes a spike in the earthquake rate. The voxel below (or above) the fracture is never shadowed so the seismicity rate increases rapidly and then decays slowly.

Figure 6A:
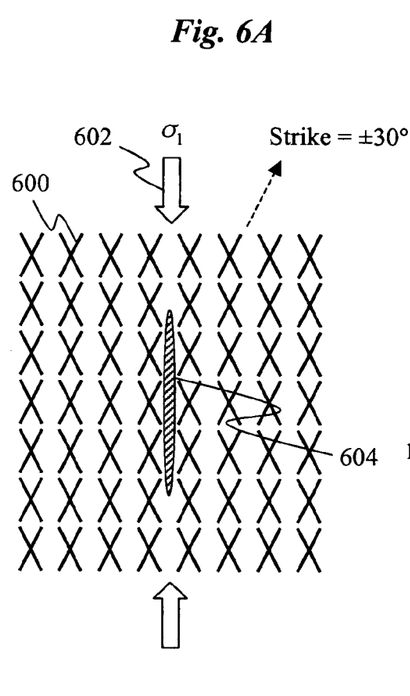
FIG. 6A shows optimally oriented conjugate faults, according to an embodiment of the invention.
Figure 6B:
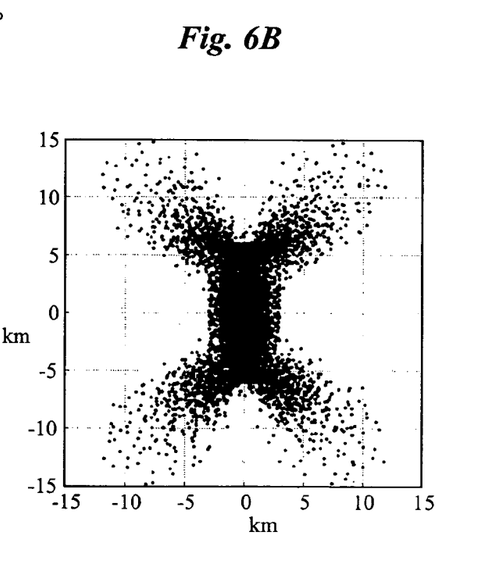
FIG. 6B is a graph showing the spatial distribution of predicted microearthquakes in the vicinity of a fracture, according to an embodiment of the invention.

FIG. 6A shows optimally oriented conjugate faults 600 at 30 degrees from the maximum compressive stress direction 602. The hydraulic fracture 604 grows parallel to this direction. FIG. 6B is a graph showing the spatial distribution of predicted microearthquakes in the vicinity of a fracture. The black dots show predicted earthquake intensity. The slightly square nature of the distribution results from the finite size of the voxels used in the calculation.

Figures 7A, 7B, 7C:
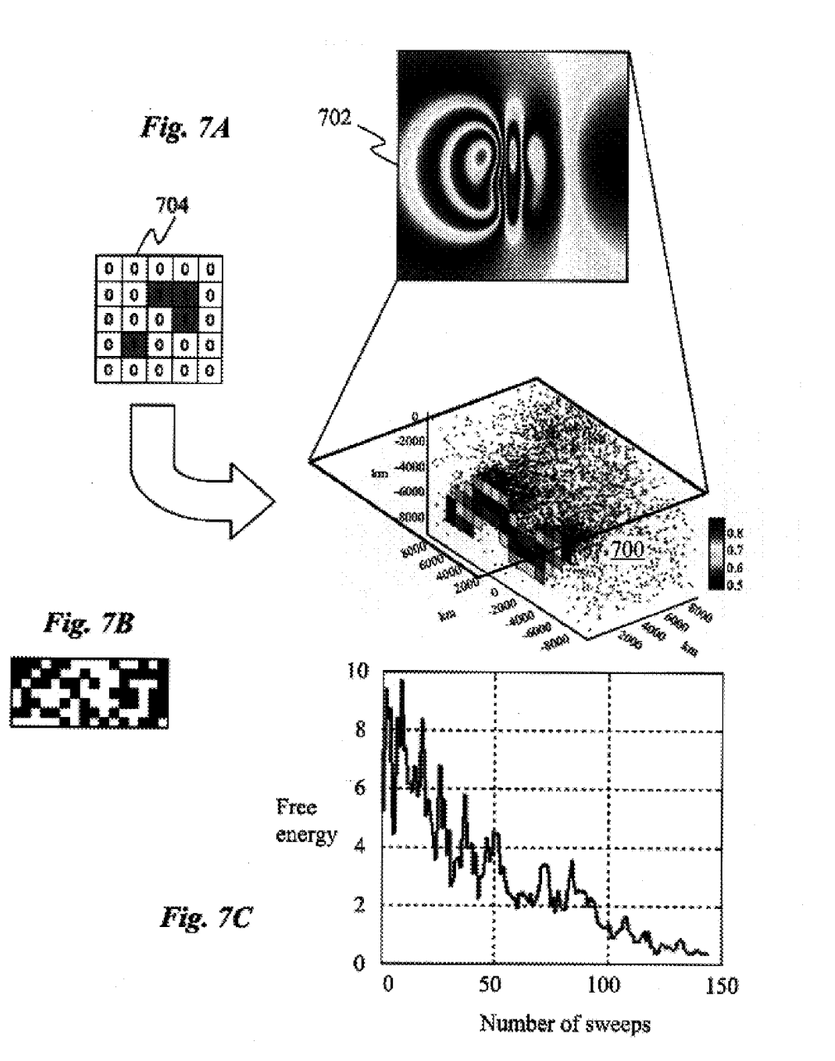
FIG. 7A is a composite of several graphs illustrating aspects of a static inversion technique, according to an embodiment of the invention.
FIG. 7B shows the geometry of a fracture image corresponding to the candidate model, according to an embodiment of the invention.
FIG. 7C is a graph illustrating the progress of a simulated annealing run, according to an embodiment of the invention.

FIG. 7A is a composite of several graphs illustrating aspects of a static inversion technique where we ignore the propagation effects and treat the stress change as a step function in time. Graph 702 indicates a simulated radar interferogram; in a hydraulic fracturing application the deformation data would more commonly come from tiltmeters. The simulated radar interferogram was computed from the example hydraulic fracture represented in graph 700 below. The shading represents the amount of opening, the black dots the simulated earthquakes. The 0's and 1's in matrix 704 on the left illustrate how we break the fracture planes into elements that either open (represented by 1) or stay closed (represented by 0). The pressure boundary condition applies to all the open elements (1's). FIG. 7B shows the geometry of a fracture image corresponding to a candidate model near the beginning of the optimization, where open voxels are represented as white and closed as black. FIG. 7C is a graph illustrating the progress of the simulated annealing run, showing the free energy (i.e., misfit to the data) as a function of the number of iterations.

The invention clamed is:

1. A method for hydraulic fracture imaging, the method comprising:
    collecting ground deformation data measured in proximity to a hydraulic fracture;
    collecting seismic activity data measured in proximity to the hydraulic fracture;
    computing a time sequence of hydraulic fracture images from the ground deformation data and seismic activity data; and
    displaying one of the hydraulic fracture images representing a final configuration;
    wherein computing the hydraulic fracture images comprises:
    computing an orientation and location of the fracture; and computing a size of the fracture consistent with the computed orientation using a stochastic optimization procedure.

2. The method of claim 1 wherein computing the orientation and location of the fracture comprises using a rectangular dislocation model to compute a dislocation that optimally fits the ground deformation data and optimally fits earthquake locations derived from the seismic activity data.

3. The method of claim 1 wherein computing the orientation of the fracture comprises using differential location methods to compute earthquake locations from the seismic activity data.

4. The method of claim 1 wherein the stochastic optimization procedure comprises:
  selecting a candidate model of the fracture consistent with the computed orientation;
  computing a predicted surface deformation from the candidate model;
  computing a predicted seismic activity from the candidate model;
  comparing the predicted surface deformation and predicted seismic activity with the collected ground deformation data and earthquake locations derived from the collected seismic activity data.

5. The method of claim 4 wherein the candidate model comprises segments in a plane of the fracture, wherein each of the segments is open if it is part of the fracture and closed if it is not part of the fracture.

6. The method of claim 4 wherein the candidate model comprises pressure boundary conditions for segments that are open.

7. The method of claim 4 wherein computing a predicted surface deformation from the candidate model uses elastic dislocation and crack theory.

8. The method of claim 4 wherein computing a predicted seismic activity from the candidate model uses Dieterich seismicity rate theory.

9. The method of claim 1 wherein computing a size of the fracture comprises computing a length, width, and opening of the fracture.

10. A computer-implemented method for imaging a hydraulic fracture, the method comprising:
  computing from ground deformation data and seismic activity data an orientation of the fracture;
  computing a size of the fracture consistent with the computed orientation using a stochastic optimization procedure to minimize a quantity composed of a weighted sum of i) a difference between a predicted deformation and the ground deformation data, and ii) a difference between a predicted seismicity and the seismic activity data; and
  displaying a hydraulic fracture image derived from the computed orientation and computed size.

11. The method of claim 10 wherein computing the orientation of the fracture comprises using a rectangular dislocation model to compute a dislocation that optimally fits the ground deformation data and optimally fits earthquake locations derived from the seismic activity data.

12. The method of claim 10 wherein computing a size of the fracture comprises:
  selecting a candidate model of the fracture consistent with the computed orientation;
  computing the predicted deformation from the candidate model; and
  computing the predicted seismic activity from the candidate model.

* * * * *